US009947105B2

(12) United States Patent
Tonoike

(10) Patent No.: US 9,947,105 B2
(45) Date of Patent: Apr. 17, 2018

(54) INFORMATION PROCESSING APPARATUS, RECORDING MEDIUM, AND INFORMATION PROCESSING METHOD

(71) Applicant: FUJI XEROX CO., LTD., Tokyo (JP)

(72) Inventor: Masatsugu Tonoike, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 41 days.

(21) Appl. No.: 15/060,915

(22) Filed: Mar. 4, 2016

(65) Prior Publication Data

US 2016/0189395 A1  Jun. 30, 2016

Related U.S. Application Data

(63) Continuation of application No. PCT/JP2014/063175, filed on May 19, 2014.

(30) Foreign Application Priority Data

Dec. 26, 2013 (JP) .................. 2013-269104

(51) Int. Cl.
| | |
|---|---|
| G06K 9/00 | (2006.01) |
| G06T 7/20 | (2017.01) |
| G06Q 10/08 | (2012.01) |
| G06K 9/32 | (2006.01) |
| H04L 29/06 | (2006.01) |

(52) U.S. Cl.
CPC ........ *G06T 7/2033* (2013.01); *G06K 9/00288* (2013.01); *G06K 9/3241* (2013.01); *G06Q 10/0833* (2013.01); *H04L 63/00* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 6,806,978 B1 * | 10/2004 | Tamura | ............... | H04N 1/00278 348/207.2 |
| 7,738,008 B1 * | 6/2010 | Ball | ................... | G06K 9/00214 348/159 |
| 2004/0130620 A1 * | 7/2004 | Buehler | ............. | G06K 9/00335 348/143 |

(Continued)

FOREIGN PATENT DOCUMENTS

| | | |
|---|---|---|
| JP | 2003-281157 A | 10/2003 |
| JP | 2006-202062 A | 8/2006 |

(Continued)

*Primary Examiner* — Nancy Bitar
(74) *Attorney, Agent, or Firm* — Oliff PLC

(57) ABSTRACT

An information processing apparatus includes a first acquisition unit, a second acquisition unit, and an associating unit. The first acquisition unit acquires first identification information stored on an object carried by a person. The second acquisition unit acquires second identification information identifying the person. When the same combination as a combination of the first identification information acquired on first date and time, and the second identification information acquired on second date and time corresponding to the first date and time is acquired on third date and time different from the first date and time, the associating unit associates the first identification information with the second identification information in the combination.

9 Claims, 7 Drawing Sheets

(56) References Cited

U.S. PATENT DOCUMENTS

2006/0061653 A1* 3/2006 Hampapur ............. H04N 7/181
                                                                348/143
2015/0264256 A1* 9/2015 Lehtiniemi ........ H04N 5/23229
                                                                348/143

FOREIGN PATENT DOCUMENTS

| JP | 2007-228195 A | 9/2007 |
| JP | 2010-238196 A | 10/2010 |
| JP | 2011-039959 A | 2/2011 |
| JP | 2013-072858 A | 4/2013 |

* cited by examiner

| | 310 | 320 | 330 | |
|---|---|---|---|---|
| | TIME | LOCATION | RADIO TERMINAL IDENTIFIER | 300 |
| | 07:00:00 | STORE A | AA | |
| | 07:00:00 | STORE A | BB | |
| | 07:00:00 | STORE A | CC | |
| | 07:00:00 | STORE A | DD | |

| | 410 | 420 | 430 | |
|---|---|---|---|---|
| | TIME | LOCATION | FACE IMAGE | 400 |
| | 07:00:01 | STORE A | !(^^)! | |
| | 07:00:10 | STORE A | (*^_^*) | |
| | 07:00:45 | STORE A | (*_*) | |
| | 07:00:50 | STORE A | (-_-) | |

FIG. 5

| TIME ~510 | LOCATION ~520 | RADIO TERMINAL IDENTIFIER ~530 | ~500 |
|---|---|---|---|
| 07:00:00 | STORE A | AA | |
| 19:00:00 | STORE B | AA | |
| 23:00:00 | STORE A | AA | |

FIG. 6

| TIME ~610 | LOCATION ~620 | FACE IMAGE ~630 | ~600 |
|---|---|---|---|
| 07:00:00 (±1 MINUTE) | STORE A | (#^.^#) (*^_^*) (+_+) (^_-) | |
| 19:00:00 (±1 MINUTE) | STORE B | (*^_^*) )^o^( (^_^;) | |
| 23:00:00 (±1 MINUTE) | STORE A | (*_*) (-_-) (*^_^*) | |

FIG. 7

| TIME ~710 | RADIO TERMINAL IDENTIFIER ~720 | ~700 |
|---|---|---|
| 07:00:00 | AA | |
| 09:00:00 | AA | |
| 12:00:00 | AA | |
| 20:00:00 | AA | |
| 23:00:00 | AA | |

FIG. 8

| TIME ~810 | FACE IMAGE ~820 | ~800 |
|---|---|---|
| 07:00:00 (±1 MINUTE) | (#^.^#) (*^_^*) (+_+) (^_-) | |
| 09:00:00 (±1 MINUTE) | (*^_^*) )^o^( (^_^;) | |
| 12:00:00 (±1 MINUTE) | (!_!) (@_@) | |
| 20:00:00 (±1 MINUTE) | (!_!) (p_-) | |
| 23:00:00 (±1 MINUTE) | (*_*) (-_-) (*^_^*) | |

INFORMATION PROCESSING APPARATUS, RECORDING MEDIUM, AND INFORMATION PROCESSING METHOD

CROSS REFERENCE TO RELATED APPLICATION

This is a continuation of International Application No. PCT/JP2014/063175 filed on May 19, 2014, and claims priority from Japanese Patent Application No. 2013-269104, filed on Dec. 26, 2013.

BACKGROUND

Technical Field

The present invention relates to an information processing apparatus, a recording medium, and an information processing method.

SUMMARY

An aspect of the present invention provides an information processing apparatus. The information processing apparatus includes a first acquisition unit that acquires first identification information stored on an object carried by a person, a second acquisition unit that acquires second identification information identifying the person, and an associating unit that, when the same combination as a combination of the first identification information acquired on first date and time, and the second identification information acquired on second date and time corresponding to the first date and time is acquired on third date and time different from the first date and time, associates the first identification information with the second identification information in the combination.

BRIEF DESCRIPTION OF THE DRAWINGS

Exemplary embodiment(s) of the present invention will be described in detail based on the following figures, wherein

FIG. 5 illustrates an example of a data structure of radio terminal identifier-time-location extraction data;

FIG. 6 illustrates an example of a data structure of identifier-time-location extraction data;

FIG. 7 illustrates an example of a data structure of the radio terminal-time-location extraction data;

FIG. 8 illustrates an example of a data structure of the identifier-time-location extraction data;

DETAILED DESCRIPTION

An exemplary embodiment of the present invention is described below on the basis of the drawings.

Figure 1:
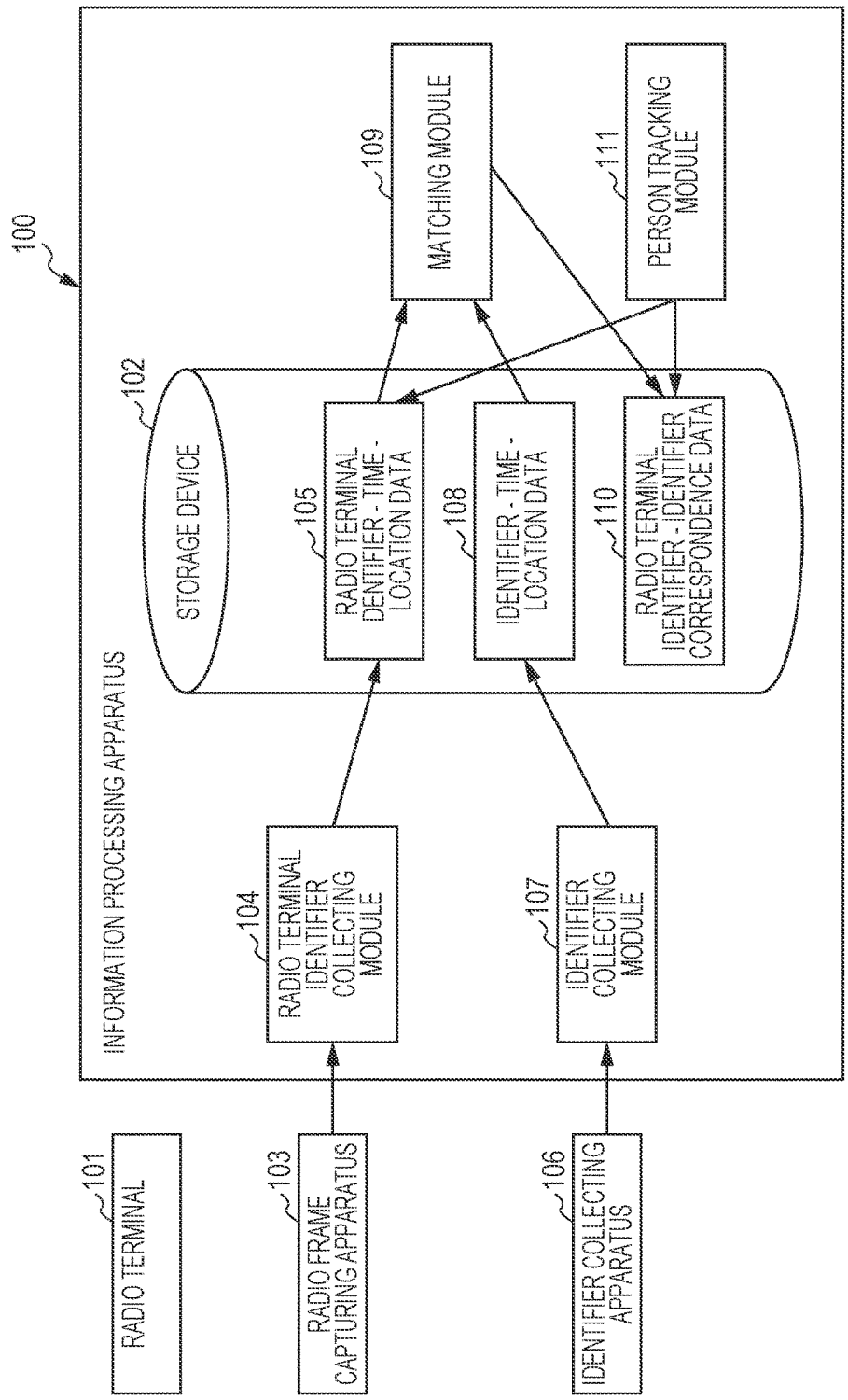
FIG. 1 is a conceptual module configuration diagram illustrating a configuration example of an embodiment.

FIG. 1 is a conceptual module configuration diagram illustrating a configuration example of the embodiment.

The term module refers to a software component that is logically separable (a computer program), a hardware component, or the like. The module of the embodiment refers to not only a module in a computer program but also a module in a hardware configuration. The discussion of the embodiment also serves as the discussion of computer programs for causing the modules to function (including a program that causes a computer to execute each step, a program that causes the computer to function as an element, and a program that causes the computer to implement each function), a system and a method. In the discussion that follows, the phrases "stores information," "causes information to be stored," and other phrases equivalent thereto are used. If the embodiment is a computer program, these phrases are intended to express "causes a memory device to store information" or "controls a memory device to cause the memory device to store information." The modules may correspond to the functions in a one-to-one correspondence. In software implementation, one module may be composed of one program or multiple modules may be composed of one program. One module may be composed of multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, and data reference relationship). The term "predetermined" means that something is decided in advance of a process of interest. The term "predetermined" is thus intended to refer to something that is decided in advance of a process of interest in the embodiment. Even after a process in the embodiment has started, the term "predetermined" refers to something that is decided in advance of a process of interest depending on a condition or a status of the embodiment at the present point of time or depending on a condition or status of the embodiment heretofore continuing down to the present point of time. If "predetermined values" are plural, the predetermined values may be different from each other, or two or more of the predetermined values (including all the values) may be equal to each other. A statement that "if A, B is to be performed" is intended to mean that it is determined whether something is A, and that if something is determined as A, an action B is to be taken. The statement becomes meaningless if the determination as to whether something is A is not performed.

The term "system" and the term "apparatus" refer to an arrangement where multiple computers, a hardware configuration, and an apparatus are interconnected via a communication network (including a one-to-one communication connection). The term "system" and the term "apparatus" also refer to an arrangement that includes a single computer, a hardware configuration, and an apparatus. The term "system" and the term "apparatus" have the same definition and are interchangeable with each other. The system in the context of the embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disk, a RAM (random-access memory), an external storage medium, a memory device connected via a communication network, and a register within a CPU (central processing unit).

The information processing apparatus 100 of the embodiment associates first identification information stored on an object carried by a user with second identification information identifying the user. As illustrated in FIG. 1, the information processing apparatus 100 includes a storage device 102, a radio terminal identifier collecting module 104, an identifier collecting module 107, a matching module 109, and a person tracking module 111. In the example herein, the first identification information is an MAC (Media Access Control Address) address of the radio terminal 101, such as a cellular phone (including a smart phone), and the second identification information is the face image of the user. In this case, the association of the first identification information with the second identification information is interpreted as associating the radio terminal 101 with the face image of the user who carries the radio terminal 101. For example, if the radio terminal identifier collecting module 104 detects the MAC address of the radio terminal 101, the face image of the holder of the radio terminal 101 is displayed.

The radio terminal 101 is an example of the object carried by the user, and stores the MAC address as an example of the first identification information. The radio terminal 101 is not limited to the cellular phone, and may be a handheld game console or a note PC. These apparatuses may have a radio communication function. The radio communications may include a radio LAN, Bluetooth (registered trademark).

A radio frame capturing apparatus 103 is connected to the radio terminal identifier collecting module 104 in the information processing apparatus 100. The radio frame capturing apparatus 103 captures a frame of radio communication by the radio terminal 101. One or more radio frame capturing apparatuses 103 may be installed in the same store.

The radio terminal identifier collecting module 104 is connected to the radio frame capturing apparatus 103 and the storage device 102. The radio terminal identifier collecting module 104 collects the first identification information transmitted from the radio terminal 101. The radio terminal identifier collecting module 104 stores on the storage device 102 observed date and time (year, month, day, hours, minutes, seconds and a fraction of a second, or a combination thereof, and is simply referred to as time), and a location (a location where the radio terminal 101 or the radio frame capturing apparatus 103 is present) as radio terminal identifier-time-location data 105. The location may not necessarily have to be a target of collection and storage.

The storage device 102 stores the radio terminal identifier-time-location data 105, identifier-time-location data 108, and radio terminal identifier-identifier correspondence data 110. The storage device 102 is accessed by the radio terminal identifier collecting module 104, the identifier collecting module 107, the matching module 109, and the person tracking module 111. The storage device 102 may not necessarily have to be included in the information processing apparatus 100 and may be arranged at a location which is accessible via a communication line (a radio communication line, a wired communication line, or a combination thereof). One or more of the three pieces of data stored on the storage device 102 may be stored on another storage device.

The radio terminal identifier-time-location data 105 is accessed by the radio terminal identifier collecting module 104, the matching module 109, or the person tracking module 111, and is data having three columns for an identifier of the radio terminal 101, time and date, and location.

The identifier collecting apparatus 106 is connected to the identifier collecting module 107 in the information processing apparatus 100. The identifier collecting apparatus 106 may be a camera (capturing a still image or a moving image), or a point card reader. The radio frame capturing apparatus 103 and the identifier collecting apparatus 106 are installed at the same location. The same location is intended to mean that the radio frame capturing apparatus 103 and the identifier collecting apparatus 106 are installed within a predetermined area. The same location may be the same store, for example. One or more identifier collecting apparatuses 106 may be installed in the same store.

The identifier collecting module 107 is connected to the identifier collecting apparatus 106 and the storage device 102. The identifier collecting module 107 collects the second identification information that identifies an individual, except for the identifier of the radio terminal 101. The second identification information may be a face image, a point card number, or clothes worn on that day. The second identification information is stored together with the observed time and data and the name of a location (the location of the identifier collecting apparatus 106 or the user) on the storage device 102 as the identifier-time-location data 108. The location may not necessarily have to be a target of collection and storage.

The identifier-time-location data 108 is accessed by the identifier collecting module 107 or the matching module 109, and is data in three columns for the second identification information, time and date, and location.

The matching module 109 is connected to the storage device 102, and accesses the radio terminal identifier-time-location data 105, the identifier-time-location data 108, and the radio terminal identifier-identifier correspondence data 110. The matching module 109 acquires the first identification information stored on the object carried by the user. For example, the matching module 109 acquires the MAC address of the radio terminal 101 (the identifier of the radio terminal 101 in the radio terminal identifier-time-location data 105). The matching module 109 then acquires the second identification information identifying the user. For example, the matching module 109 acquires the face image (the identifier in the identifier-time-location data 108).

The matching module 109 associates the first identification information with the second identification information to generate information that identifies the same user, based on the first identification information, the date and time on which the first identification information is acquired, the second identification information, and the date and time on which the second identification information is acquired. If the same combination as the combination of the first identification information acquired on first date and time and the second identification information acquired on second date and time is acquired on third date and time different from the first date and time, the matching module 109 associates the first identification information with the second identification information in that combination. Information about a location may be used. In such a case, if the same combination as the combination of the first identification information acquired on first date, time, and location and the second identification information acquired on second date, time, and location is acquired on third date, time, and location different from the first date, time, and location, the matching module 109 associates the first identification information with the second identification information in that combination.

More specifically, the matching module 109 associates the first identification information of the radio terminal 101 with the second identification information stored on the storage device 102, and stores the first identification information and the second identification information in association with each other as the radio terminal identifier-identifier correspondence data 110 on the storage device 102.

The radio terminal identifier-identifier correspondence data 110 is accessed by the matching module 109, or the person tracking module 111, and is the first identification information and the second identification information associated with each other by the matching module 109. In the example herein, the radio terminal identifier-identifier correspondence data 110 is data of two columns for the identifier of the radio terminal 101 and the identifier.

The person tracking module 111 is connected to the storage device 102, and accesses the radio terminal identifier-identifier correspondence data 110, or the radio terminal identifier-time-location data 105. The person tracking module 111 extracts the location where the user has been present and the date and time when the user has been present, from the radio terminal identifier-time-location data 105, based on the association results by the matching module 109 (the radio terminal identifier-identifier correspondence data 110). More specifically, the person tracking module 111 keeps track of the movement of the person having given identification information (when and where the user has been).

Figures 2, 3, 4:
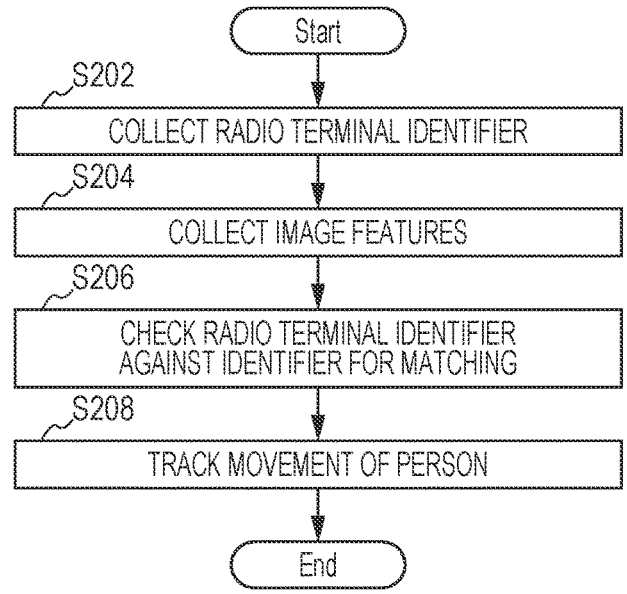
FIG. 2 is a flowchart illustrating a process example of the embodiment.
FIG. 3 illustrates an example of a data structure of radio terminal identifier-time-location data.
FIG. 4 illustrates an example of a data structure of identifier-time-location data.

FIG. 2 is a flowchart illustrating a process example of the embodiment. A retailer owing several stores is described herein, for example. Also, the first identification information may be the identifier of the radio terminal 101, and the second identification information may be image features of a face image extracted by a monitoring camera installed in the store.

In step S202, the radio terminal identifier collecting module 104 collects the identifier of the radio terminal 101. The radio terminal identifier collecting module 104 collects the identifiers of all the radio terminals 101 entering a specific area of the radio frame capturing apparatus 103 installed in each store.

More specifically, if the radio terminal 101 is a radio LAN terminal, the radio terminal identifier collecting module 104 examines all "Probe Request frames" transmitted when the radio LAN terminal searches for an access point having a particular ESSID, collects the MAC addresses of the radio terminals 101 included in the Probe Request frames, and stores on the storage device 102 the MAC addresses together with the time and date, and information of a store name as the radio terminal identifier-time-location data 105.

For example, FIG. 3 illustrates an example of the radio terminal identifier-time-location data 105 accumulated on a store A at 7:00:00 in the morning. FIG. 3 illustrates a data structure of radio terminal identifier-time-location data 300. The radio terminal identifier-time-location data 300 includes a time column 310, a location column 320, and a radio terminal identifier column 330. The time column 310 stores date and time on which data collection is made. The location column 320 stores a location where the data collection is made. The radio terminal identifier column 330 stores an identifier of the radio terminal 101 (the first identification information).

In step S204, the identifier collecting module 107 collects the image feature of the face image as the second identification information. The identifier collecting apparatus 106 installed in each store collects all the second identification information. In the example herein, the identifier collecting apparatus 106 performs an available face detection process on the image obtained by a monitoring camera installed in a store, thereby detecting and collecting the face region of a person. The image feature is a face image itself extracted using a face detection technique or a feature extracted using a feature extraction technique in the face image recognition.

The detected face image is stored together with information of time and store name on the storage device 102 as the identifier-time-location data 108. FIG. 4 illustrates an example of face images accumulated on the store A at about 7:00 in the morning (example of the identifier-time-location data 108). For convenience of explanation, each face image is represented by a smiley. FIG. 4 illustrates an example of the data structure of identifier-time-location data 400. The identifier-time-location data 400 includes a time column 410, a location column 420, and a face image column 430. The time column 410 stores the date and time on which an image is photographed. The location column 420 stores a location where the image is photographed. The face image column 430 stores the face image extracted from the photographed image. If multiple persons are present in the photographed image, multiple face images result.

In step S206, the matching module 109 matches the identifier of the radio terminal 101 against the identifier.

In step S206, the matching module 109 matches the accumulated radio terminal identifier-time-location data 105 against the identifier-time-location data 108 during a predetermined period of time (such as one day), and identifies a matching relationship between the radio terminal identifier (the first identification information) against the second identification information.

In a summary of the process, the matching module 109 compares the second identification information appearing on the date, time, and location on which the identifier of a given radio terminal 101 is acquired, and associates the commonly appearing second identification information with the identifier of the radio terminal 101. In this case, the date, time, and location do not necessarily have to match completely. This is because the date, time, and location on which the first identification information is acquired do not necessarily fully match the date, time, and location on which the second identification information is acquired. It is sufficient enough if the second identification information is acquired on the date, time, and location corresponding to the date, time, and location on which the first identification information is acquired. As described below, the date and time on which the second identification information is acquired may be compared within a range. Whether the date and time of the first identification information correspond to the date and time of the second identification information may be determined depending on whether a difference between the date and time and the other date and time is less than or equal to or below a threshold value. The location may be a location name (such as the store A), and is a fully matched example. If a location is represented by latitude and longitude, the location correspondence may be determined depending on the range or depending on whether a difference between two points is less than or equal to or below a predetermined threshold value. Needless to say, "match" in this context includes the case of full match.

The process is specifically discussed.

In the example described herein, a face image corresponding to an identifier AA of the radio terminal 101 is searched for.

On July 10, the date, time, and location on which the radio terminal identifier AA of the radio terminal 101 are extracted from the radio terminal identifier-time-location data 105 (the radio terminal identifier-time-location data 300). FIG. 5 illustrates extraction results. FIG. 5 illustrates a data structure of radio terminal identifier-time-location extraction data 500. The radio terminal identifier-time-location extraction data 500 includes a time column 510, a location column 520, and a radio terminal identifier column 530. The time column 510 stores date and time when data collection has been performed. The location 520 stores a location where data collection has been performed. The radio terminal identifier column 530 stores the identifier of the radio terminal 101. The radio terminal identifier-time-location extraction data 500 has a data structure identical to the data structure of the radio terminal identifier-time-location data 300, but results from extracting the data of the identifier AA of the radio terminal 101. The identifier AA of the radio terminal 101 is data that is extracted at the location every predetermined period of time (for example, every hour). If the radio terminal 101 is near the radio frame capturing apparatus 103, the identifier of the radio terminal 101 is continuously obtained. Thus, only data used in the operation in step S206 is extracted.

Then, the face image acquired on the date and time close to the date and time when the identifier "AA" of the radio terminal 101 is acquired (for example, within a range from one minute before to one minute after when the identifier "AA" of the radio terminal 101 is acquired, or just when the identifier "AA" of the radio terminal 101 is acquired) and the location where the identifier "AA" of the radio terminal 101 is acquired is extracted from the identifier-time-location data 108. FIG. 6 illustrates the extraction results. FIG. 6 illustrates a data structure of identifier-time-location extraction data 600. The identifier-time-location extraction data 600 includes a time column 610, a location column 620, and a face image column 630. The time column 610 stores the date and time on which the images are photographed. The location column 620 stores the location where the images are photographed. The face image column 630 stores face images extracted from the photographed images. The identifier-time-location extraction data 600 is identical in structure to the identifier-time-location data 400, but the time column 610 indicates a period of time as described above. For this reason, the face image column 630 is likely to store multiple face images. The date and time in the time column 610 correspond to the date and time in the time column 510 of the radio terminal identifier-time-location extraction data 500 (in this example, the date and time within a range including the date and time in the time column 510). The location in the location column 620 corresponds to the location column 520 in the radio terminal identifier-time-location extraction data 500 (match in this case).

A common face image is selected from the results (the identifier-time-location extraction data 600). An available face recognition technique may be used to determine whether face images are identical to each other.

In this example, "(*^_^*)" is extracted as a common face image.

The face image "(*^_^*)" is associated with the radio terminal identifier "AA", and is then stored on the storage device 102 as the radio terminal identifier-identifier correspondence data 110.

In this case, the search range is narrowed to the identifier of a particular radio terminal, and the face image is searched from the face images appearing close to the time and location in which the identifier of the radio terminal appears. This process may be reversed. The search range is narrowed to a particular face image, and the identifier of the radio terminal common to the identifiers of the radio terminals appearing close to the time and location in which the face image appears. More specifically, any process may be acceptable as long as the same combination as the combination of the radio terminal 101 and the face image is searched from different dates and times in the process.

If only a single store is considered, location information is not considered. If multiple stores are considered in the embodiment, the location information may not still very necessary. However, since the addition of the location information excludes a face at a different location in the selection of the face images acquired on the same date and time, recognition error of the face information is thus reduced.

If there is no common face image on all the dates and times (each row of the identifier-time-location extraction data 600), a face image that appears most frequently by n times may be selected. Here, n is an integer variable equal to or above 1.

In step S208, the person tracking module 111 tracks the movement of a person. This process is optional (does not necessarily have to be performed). In step S208, information indicating where and when a person having a particular identifier have moved.

In this example, the movement of a person having the face image "(*^_^*)" may be presented. The radio terminal identifier "AA" corresponding to that face image is first acquired from the radio terminal identifier-identifier correspondence data 110.

If only the data including the radio terminal identifier "AA" is extracted from the radio terminal identifier-time-location data 105, the movement of the face image) "(*^_^*)" is determined.

More specifically, the face image "(*^_^*)" has moved as follows: "Store A 07:00:00→Store B 19:00:00→Store A 23:00:00".

Subsequent to the operation in step S206, the movement of the face image) "(*^_^*)" is tracked by simply acquiring the identifier of the radio terminal 101.

Next, another process of the matching module 109 is described below.

The radio terminal 101 may be shared and used by multiple persons (father and daughter, etc., for example). In such a case, the matching module 109 determines that there is some kind of relationship between them, and an association process is performed.

The location information is omitted for simplicity of explanation. Even if the location information is included, the discussion of the matching module 109 remains the same.

Radio terminal identifier-time-location extraction data 700 indicates information regarding the date and time, namely July 15, on which the identifier AA of the radio terminal 101 is acquired, and the radio terminal identifier-time-location extraction data 700 is extracted from the radio terminal identifier-time-location data 105. FIG. 7 illustrates a data structure of the radio terminal identifier-time-location extraction data 700. The radio terminal identifier-time-location extraction data 700 includes a time column 710, and a radio terminal identifier column 720. The time column 710 stores the date and time on which the identifier of the radio terminal 101 is acquired. The radio terminal identifier column 720 stores the identifier of the radio terminal 101 that is acquired on the date and time.

The face image acquired on date and time close to that date and time is extracted from the identifier-time-location data 108. The example of the results extracted is illustrated as identifier-time-location extraction data 800. The example of the results is referred to as a table A. FIG. 8 illustrates a data structure of the identifier-time-location extraction data 800. The identifier-time-location extraction data 800 includes a time column 810 and a face image column 820. The time column 810 stores the date and time on which the images are photographed. The time column 810 corresponds to the data and time in the time column 710. The face image column 820 stores the face images that are photographed on the date and time. In this case, there is no face image common to all dates and times (the rows of the identifier-time-location extraction data 800).

Figure 10:
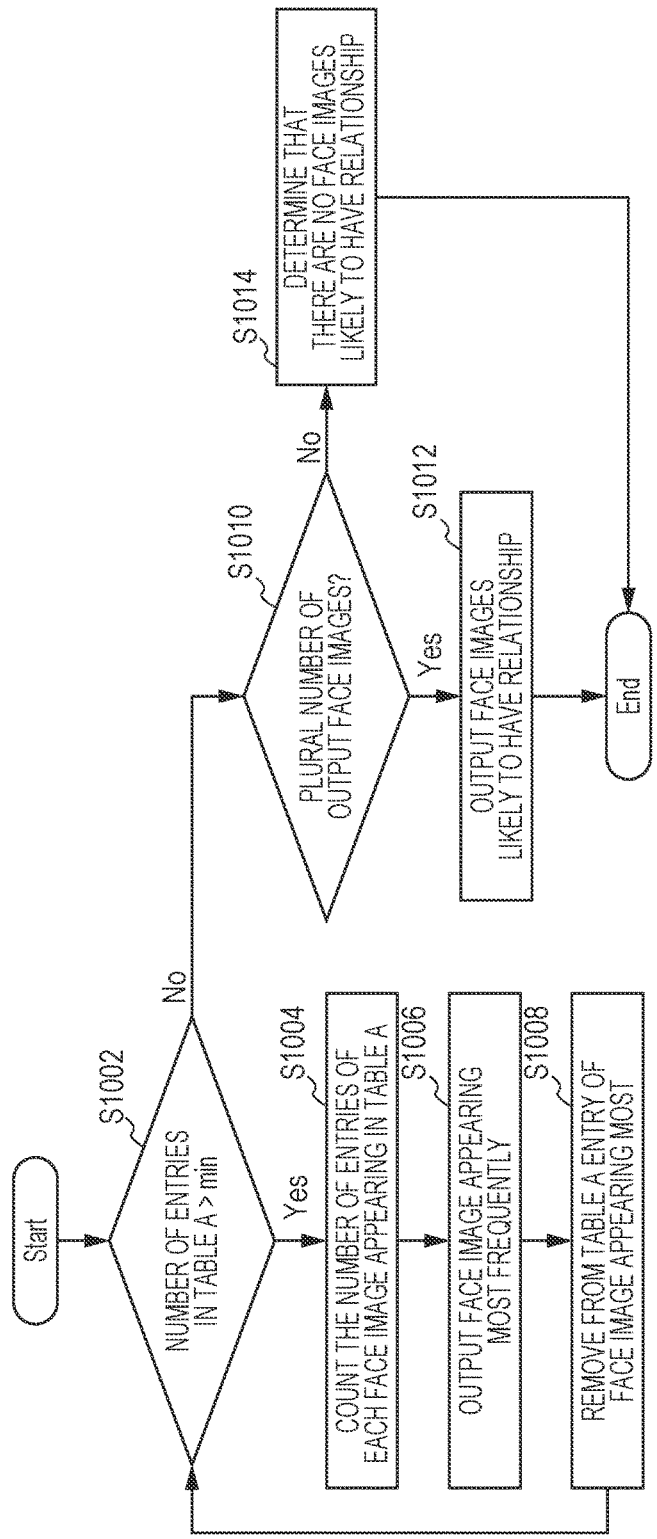
FIG. 10 is a flowchart illustrating an example of a process of the embodiment.

The process is performed in accordance with the algorithm of FIG. 10, and if there are multiple face images output, those face images are output as having a relationship.

Figure 9:
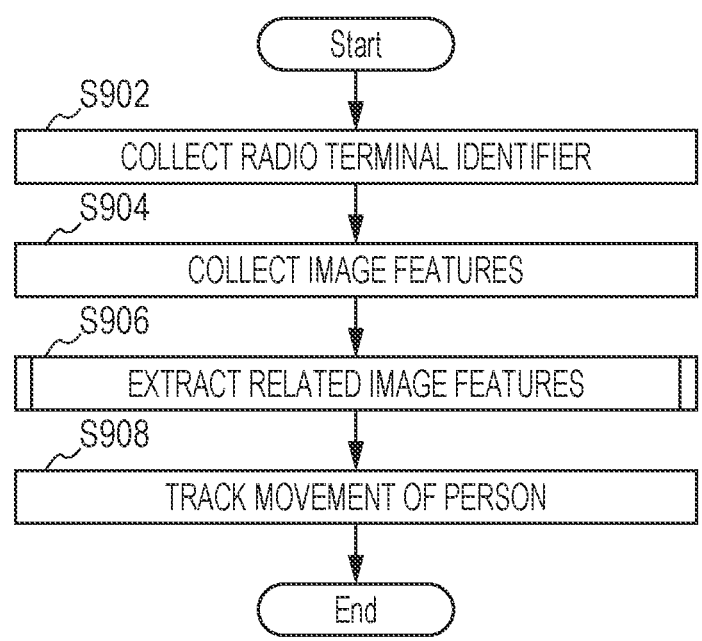
FIG. 9 is a flowchart illustrating an example of a process of the embodiment.

FIG. 9 is a flowchart illustrating an example of a process of the embodiment. This flowchart is identical to the flowchart of FIG. 2 except that step S206 is different.

In step S902, the radio terminal identifier collecting module 104 collects the identifier of the radio terminal 101.

In step S904, the identifier collecting module 107 collects the image features.

In step S906, the matching module 109 extracts the image features having a relationship. The operation in step S906 is described with respect to FIG. 10.

In step S908, the person tracking module 111 tracks the movement of the person. A movement tracking target is a group of persons that are determined to have a relationship.

FIG. 10 is a flowchart illustrating an example of a process (step S906) of the embodiment. From among the face images acquired on the date and time in the time column 810 of the identifier-time-location extraction data 800, multiple face images are determined to have a relationship, and those face images are associated with the radio terminal 101.

FIG. 10 is the flowchart of an example of extracting a given face image that is likely to have a relationship.

In step S1002, it is determined whether the condition of the number of entries of the table A (the identifier-time-location extraction data 800)>min holds. If the condition of the number of entries of the table A>min holds, processing proceeds to step S1004. Otherwise, processing proceeds to step S1010. Here, min is an integer equal to or above 1.

In step S1006, a face image appearing the most frequently is output.

In step S1008, an entry including the face image appearing most frequently is deleted. This causes the number of rows in the table A to be reduced.

In step S1010, it is determined whether the number of face images output in step S1006 is multiple. If the number of face images is multiple, processing proceeds to step S1012. Otherwise, processing proceeds to step S1014.

In step S1012, the face image likely to have a relationship is output. In the example of FIG. 8, the face image "(*^_^*)" appearing three times and the face image "(!_!)" appearing twice are the face images likely to have a relationship.

In step S1014, it is determined that "there no face images that are likely to have a relationship".

In the embodiment described above, the radio terminal identifier collecting module 104 collects the MAC address of the radio LAN terminal. The first identification information may be the ID of a radio terminal other than the radio LAN, such as Bluetooth (registered trademark) ID or RFID tag ID. The radio terminal does not necessarily have to be used. For example, any object is acceptable as long as the object is carried by the user and is capable of collecting identification information identifying the object or the user who is a holder of the object. For example, the object may be a point card, such as a contactless or contact-type IC card. The object may be a bar code (including a two-dimensional bar code), or a card having alphanumerical letters written thereon. In such a case, the radio frame capturing apparatus 103 of FIG. 1 is a card reader. More specifically, the radio frame capturing apparatus 103 has a bar code reading function, a character recognition function, and the like.

The second identification information may be part of the image of the photographed user (the face image, the image of clothes, and the like), the ID of each of the above-described cards, or biological information such as fingerprint. The second identification information is different from the first identification information. The fingerprint may be acquired at an entry/exit detection apparatus (also referred to as a flapper gate) that may be installed at the entrance of a room, or building.

Specific combinations of the first identification information and the second identification information include the MAC address of a mobile information terminal and the face image, the ID of the RFID tag and the face image, the ID of the point card and the face image, the MAC address of the mobile information terminal and the ID of the point card, the ID of the RFID tag and the ID of the point card, the ID of the point card and the ID of other point card, the MAC address of the mobile information terminal and fingerprint information, and other combinations. Thus, in a case where identification information of one is detected, identification information of the other one can be acquired.

Figure 11:
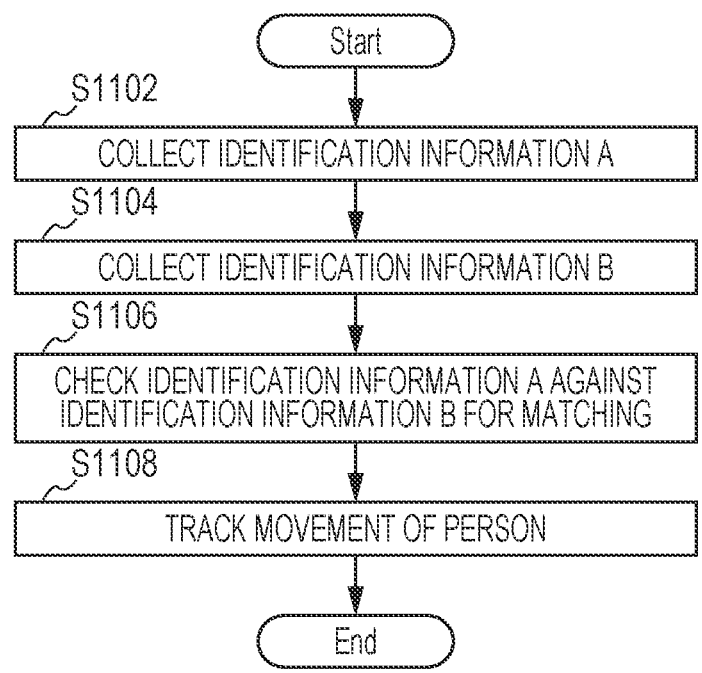
FIG. 11 is a flowchart illustrating an example of a process of the embodiment.

FIG. 11 is a flowchart illustrating an example of the process of the embodiment. The flowchart of FIG. 11 corresponds to the flowchart of FIG. 2 in terms of the first identification information (identification information A) and the second identification information (identification information B).

In step S1102, an identification information A collecting module collects the identification information A. For example, the identification information A collecting module receives the identification information A from a card reader.

In step S1104, an identification information B collecting module collects the identification information B. For example, the identification information B collecting module receives an image from a camera.

In step S1106, the matching module 109 matches the identification information A against the identification information B.

In step S1108, the person tracking module 111 tracks the movement of the person.

Figure 12:
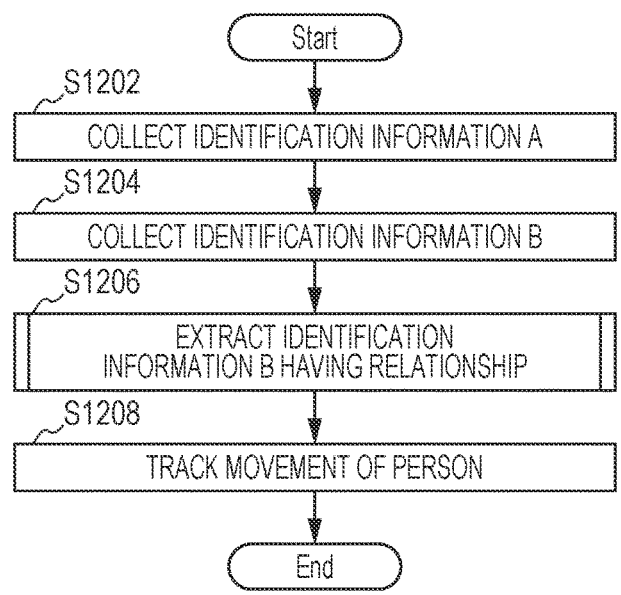
FIG. 12 is a flowchart illustrating an example of a process of the embodiment.

FIG. 12 is a flowchart illustrating an example of the process of the embodiment. The flowchart of FIG. 12 corresponds to the flowchart of FIG. 9 in terms of the first identification information (identification information A) and the second identification information (identification information B).

In step S1202, an identification information A collecting module collects the identification information A.

In step S1204, an identification information B collecting module collects the identification information B.

In step S1206, the matching module 109 extracts the identification information B having a relationship.

In step S1208, the person tracking module 111 tracks the movement of the person.

In the discussion heretofore, the association between the first identification information and the second identification information is one-to-one correspondence or one-to-n correspondence (such as father and daughters). The association between the first identification information and the second identification information may be n to m correspondence. Here, n and m are integers equal to or above 1, and n and m may be equal to each other.

For example, the second identification information may be uniforms of employees or students. In such a case, the radio frame capturing apparatus 103 captures the first identification information of a radio terminal of each of the employees. The identifier collecting apparatus 106 collects multiple pieces of the second identification information from the uniforms of the employees. If the same combination as the combination of the first identification information and the second identification information is acquired on different date and time (or on different date and time, and at a different location), the first identification information and the second identification information in that combination are associated with each other.

Figure 13:
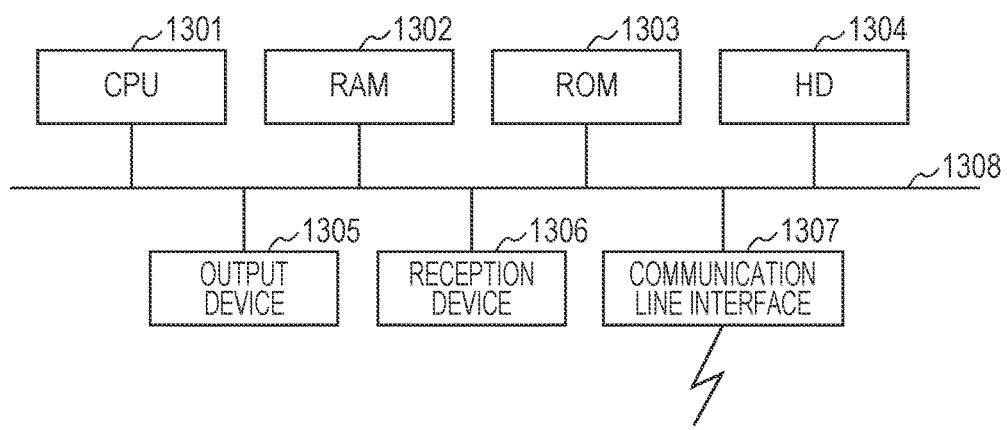
FIG. 13 is a block diagram illustrating a hardware configuration of a computer implementing the embodiment.

A computer hardware configuration of a computer on which programs as the embodiment run is a standard computer as illustrated in FIG. 13. Specifically, the computer hardware configuration is a computer that may serve as a personal computer or a server. More specifically, a central processing unit (CPU) 1301 is used as a processor (arithmetic processor), and a RAM 1302, a ROM 1303, and a HD 1304 are used as a storage device. A hard disk may be used for the HD 1304. The computer includes the CPU 1301 that executes programs such as the radio terminal identifier collecting module 104, the identifier collecting module 107, the matching module 109, and the person tracking module 111. The computer further includes the RAM 1302 that stores the programs and data, the ROM 1303 that stores a program to start up the computer and other programs, the HD 1304 that is an auxiliary storage device (such as a flash memory), a reception device 1306 that receives data responsive to an operation that a user performs on a keyboard, a mouse, a touchpanel, and the like, an output device 1305 such as a CRT or a liquid-crystal display, a communication line interface 1307, such as a network interface card, for connection with a communication network, and a bus 1308 that interconnects these elements to exchange data thereamong. Multiple computers of this type may be interconnected to each other via a network.

A computer program of the embodiment may be read as software onto the system of the hardware configuration, and the embodiment is thus implemented with the software and hardware resources operating in cooperation.

The hardware configuration of FIG. 13 indicates a configuration example only. The embodiment is not limited to this hardware configuration of FIG. 13 and may be acceptable in any form as long as the modules of the embodiment are implemented. For example, some modules may be implemented by dedicated hardware (for example, ASIC or the like). In another example, some modules may be in an external system and connected to the system of FIG. 13 via a communication network. In yet another example, plural systems of FIG. 13 may be interconnected to each other via a communication line such that the systems operate in concert with each other. One of the modules may be incorporated not only in a personal computer, but also in a network home appliance, a copying machine, a facsimile device, a scanner, a printer, a multi-function apparatus (an image processing apparatus having at least two of the functions of the scanner, the printer, the copying machine, and the facsimile device).

The above-described program may be supplied in a stored state on a recording medium. The program may also be provided via communications. In such a case, the above-described program may be understood as an invention of a "non-transitory computer readable recording medium storing the program".

The "non-transitory computer readable recording medium storing the program" refers to a computer readable recording medium storing the program, and is used to install the program, to execute the program, or to distribute the program.

The recording media include digital versatile disk (DVD), compact disk (CD), Blu-ray disk (registered trademark), magnetooptical disk (MO), flexible disk (FD), magnetic tape, hard disk, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD (CD-R), and rewritable CD (CD-RW).

The program in whole or in part may be stored on the recording medium for storage and distribution. The program in whole or in part may be transmitted via a transfer medium. The transfer media include a wired network, a wireless network, or a combination thereof. The wired and wireless networks may include a local-area network (LAN), a metropolitan-area network (MAN), a wide-area network (WAN), the Internet, an intranet, and an extranet. The program in whole or in part may be transmitted over a carrier wave.

The program may be part of another program, or may be stored on the recording medium together with another program. The program may be split and split programs may then be separately stored on the recording media. The program may be processed in any fashion before being stored as long as the program remains restorable. For example, the program may be compressed or encrypted before storage.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. An information processing apparatus comprising:
   a first acquisition unit that acquires a plurality of pieces of first identification information, each of the plurality of pieces of first identification information being stored on an object carried by a person;
   a second acquisition unit that acquires a plurality of pieces of second identification information, each of the plurality of pieces of second identification information identifying the person;

a storage unit that stores: (i) the first identification information, (ii) a first date and time information corresponding to each date and time of when each piece of the plurality of pieces of first identification information is acquired, (iii) the acquired second identification information, and (iv) a second date and time information corresponding to each date and time of when each piece of the plurality of pieces of second identification information is acquired; and an associating unit that associates one piece of the plurality of pieces of the first identification information with one piece of the plurality of pieces of the second identification information by:

extracting a plurality of pieces of first date and time information from the storage unit, each piece of the plurality of pieces of first date and time information corresponding to the one piece of first identification information;

determining and extracting a plurality of sets corresponding to a plurality of pieces of second identification information, each of the plurality of sets including: (i) one of the plurality of pieces of second identification information, (ii) a corresponding piece of the second date and time information, and (iii) a corresponding one of the plurality of pieces of the extracted first date and time information; and determining a match by selecting a common piece of the second identification information located in the plurality of the sets, the selected common piece being the one piece of the plurality of pieces of the second identification information that is associated with the one piece of the plurality of pieces of the first identification information.

2. The information processing apparatus according to claim 1, wherein:

the storage unit further stores: (i) a plurality of pieces of first location information, each piece of the plurality of pieces of first location information corresponding to a location where one piece of the plurality of pieces of the first identification information is acquired, and (ii) a plurality of pieces of second location information, each piece of the plurality of pieces of second location information corresponding to a location where one piece of the plurality of pieces of the second identification information is captured; and the association unit associates the one piece of the first identification information with the one piece of the second identification information by:

extracting a plurality of first combinations of a piece of the first date and time information and a piece of the first location information, each of the plurality of first combinations corresponding to the one piece of first identification information;

determining and extracting a plurality of the sets corresponding to a plurality of pieces of the second identification information, each of the plurality of sets including a second combination of a piece of the second date and time information and a piece of the second location information, each second combination corresponding to one of the extracted first combinations; and determining a match by selecting a common piece of the second identification information located in the plurality of the sets, the selected common piece being the one piece of the second identification information associated with the one piece of first identification information.

3. The information processing apparatus according to claim 2, further comprising an extracting unit that extracts a date and time when the person has been present, and location where the person has been present, based on the association performed by the associating unit.

4. The information processing apparatus according to claim 1, wherein the associating unit associates a piece of the first identification information with a piece of the second identification information based on a determination that a plurality of pieces of the second identification information acquired on the second date and time has a relationship.

5. A non-transitory recording medium storing a program recorded thereon, the program causing a computer to function as:

a first acquisition unit that acquires a plurality of pieces of first identification information, each of the plurality of pieces of first identification information being stored on an object carried by a person;

a second acquisition unit that acquires a plurality of pieces of second identification information, each of the plurality of pieces of second identification information identifying the person;

a storage unit that stores: (i) the first identification information, (ii) a first date and time information corresponding to each date and time of when each piece of the plurality of pieces of first identification information is acquired, (iii) the acquired second identification information, and (iv) a second date and time information corresponding to each date and time of when each piece of the plurality of pieces of second identification information is acquired; and an associating unit that associates one piece of the plurality of pieces of the first identification information with one piece of the plurality of pieces of the second identification information by:

extracting a plurality of pieces of first date and time information from the storage unit, each piece of the plurality of pieces of first date and time information corresponding to the one piece of first identification information;

determining and extracting a plurality of sets corresponding to a plurality of pieces of second identification information, each of the plurality of sets including: (i) one of the plurality of pieces of second identification information, (ii) a corresponding piece of the second date and time information, and (iii) a corresponding one of the plurality of pieces of the extracted first date and time information; and determining a match by selecting a common piece of the second identification information located in the plurality of the sets, the selected common piece being the one piece of the plurality of pieces of the second identification information that is associated with the one piece of the plurality of pieces of the first identification information.

6. An information processing method comprising:

acquiring, by a first acquisition unit, a plurality of pieces of first identification information, each of the plurality of pieces of first identification information being stored on an object carried by a person;

acquiring, by a second acquisition unit, a plurality of pieces of second identification information, each of the plurality of pieces of second identification information identifying the person;

storing, by a storage unit: (i) the first identification information, (ii) a first date and time information corresponding to each date and time of when each piece of the plurality of pieces of first identification information is acquired, (iii) the acquired second identification information, and (iv) a second date and time information corresponding to each date and time of when each piece of the plurality of pieces of second identification information is acquired; and associating, by an associating unit, one piece of the plurality of pieces of the first identification information with one piece of the plurality of pieces of the second identification information by:

extracting a plurality of pieces of first date and time information from the storage unit, each piece of the plurality of pieces of first date and time information corresponding to the one piece of first identification information;

determining and extracting a plurality of sets corresponding to a plurality of pieces of second identification information, each of the plurality of sets including: (i) one of the plurality of pieces of second identification information, (ii) a corresponding piece of the second date and time information, and (iii) a corresponding one of the plurality of pieces of the extracted first date and time information; and determining a match by selecting a common piece of the second identification information located in the plurality of the sets, the selected common piece being the one piece of the plurality of pieces of the second identification information that is associated with the one piece of the plurality of pieces of the first identification information.

7. The information processing apparatus of claim 1, wherein:

the first identification information is a Media Access Control (MAC) Address of the object; and the second identification information is selected from the group consisting of: a face image of the person and clothes worn by the person.

8. The non-transitory recording medium of claim 5, wherein:

the first identification information is a Media Access Control (MAC) Address of the object; and the second identification information is selected from the group consisting of: a face image of the person and clothes worn by the person.

9. The information processing method of claim 6, wherein:

the first identification information is a Media Access Control (MAC) Address of the object; and the second identification information is selected from the group consisting of: a face image of the person and clothes worn by the person.

* * * * *